United States Patent [19]

Schneider et al.

[11] 4,095,077

[45] June 13, 1978

[54] AUTOMATIC HOT FILLER WIRE WELDING METHOD AND APPARATUS

[75] Inventors: Urban A. Schneider; Robert D. Sigman, both of Pensacola, Fla.

[73] Assignee: Westinghouse Electric Corp., Pittsburgh, Pa.

[21] Appl. No.: 699,769

[22] Filed: Jun. 25, 1976

[51] Int. Cl.² .............................................. B23K 9/12
[52] U.S. Cl. ................................. 219/61; 219/125.12; 219/137.7
[58] Field of Search .............. 219/137 R, 137 PS, 61, 219/60 R, 60 A, 131 F, 131 R, 124, 125 R, 125 PL, 130

[56] References Cited

U.S. PATENT DOCUMENTS

| 3,122,629 | 2/1964 | Manz | 219/137 R |
|---|---|---|---|
| 3,261,960 | 7/1966 | Lehnert | 219/60 R |
| 3,267,251 | 8/1966 | Anderson | 219/125 PL |
| 3,483,354 | 12/1969 | Manz et al. | 219/137 PS |
| 3,509,314 | 4/1970 | Freytag | 219/130 |
| 3,555,239 | 1/1971 | Kerth | 219/131 R |
| 3,651,290 | 3/1972 | Durbim et al. | 219/60 A |
| 3,737,614 | 6/1973 | Paulange | 219/60 A |
| 4,019,016 | 4/1977 | Friedman et al. | 219/60 A |

FOREIGN PATENT DOCUMENTS

| 40-5,299 | 6/1962 | Japan | 219/60 A |
|---|---|---|---|
| 192,321 | 4/1967 | U.S.S.R. | 219/60 A |

Primary Examiner—Arthur T. Grimley
Assistant Examiner—Clifford C. Shaw
Attorney, Agent, or Firm—D. C. Abeles; Z. L. Dermer

[57] ABSTRACT

A method and apparatus for preheating filler material to a temperature approaching its melting point prior to deposit within a weld zone. The weld zone and deposited filler material are then heated sufficiently to form an integral weldment. The power imparted to preheat the filler material is automatically, programmably, controlled as a predetermined function of the filler material deposition rate to obtain smooth melting of the filler material within the weld zone at any given filler material feed speed.

In an application to welding an extended seam along a workpiece wherein the weld zone is moved along the seam, the power employed to heat the weld zone and the filler material feed speed are additionally controlled as a function of the speed of movement of the weld zone along the seam.

In an application to welding generally cylindrical members along a designated circumferential weld seam, the method and apparatus of this invention simultaneously produce substantially identical welds at a plurality of spaced weld zones along the weld seam symmetrically situated about an axis bisecting the axis of revolution of the member by automatically controlling and establishing a substantially identical ratio of heat input to volume of deposited metal along the weld seam at each of the weld zones at any given point in time. Identical welds are achieved by automatically, programmably, controlling the power employed to preheat the filler material at each welding location as a function of the corresponding filler material feed speed and the respective feed speed and power imparted to each weld zone as a programmed function of the speed of the weld zone along the seam and the respective feed speed and welding power corresponding to each of the other weld zones along the seam.

4 Claims, 20 Drawing Figures

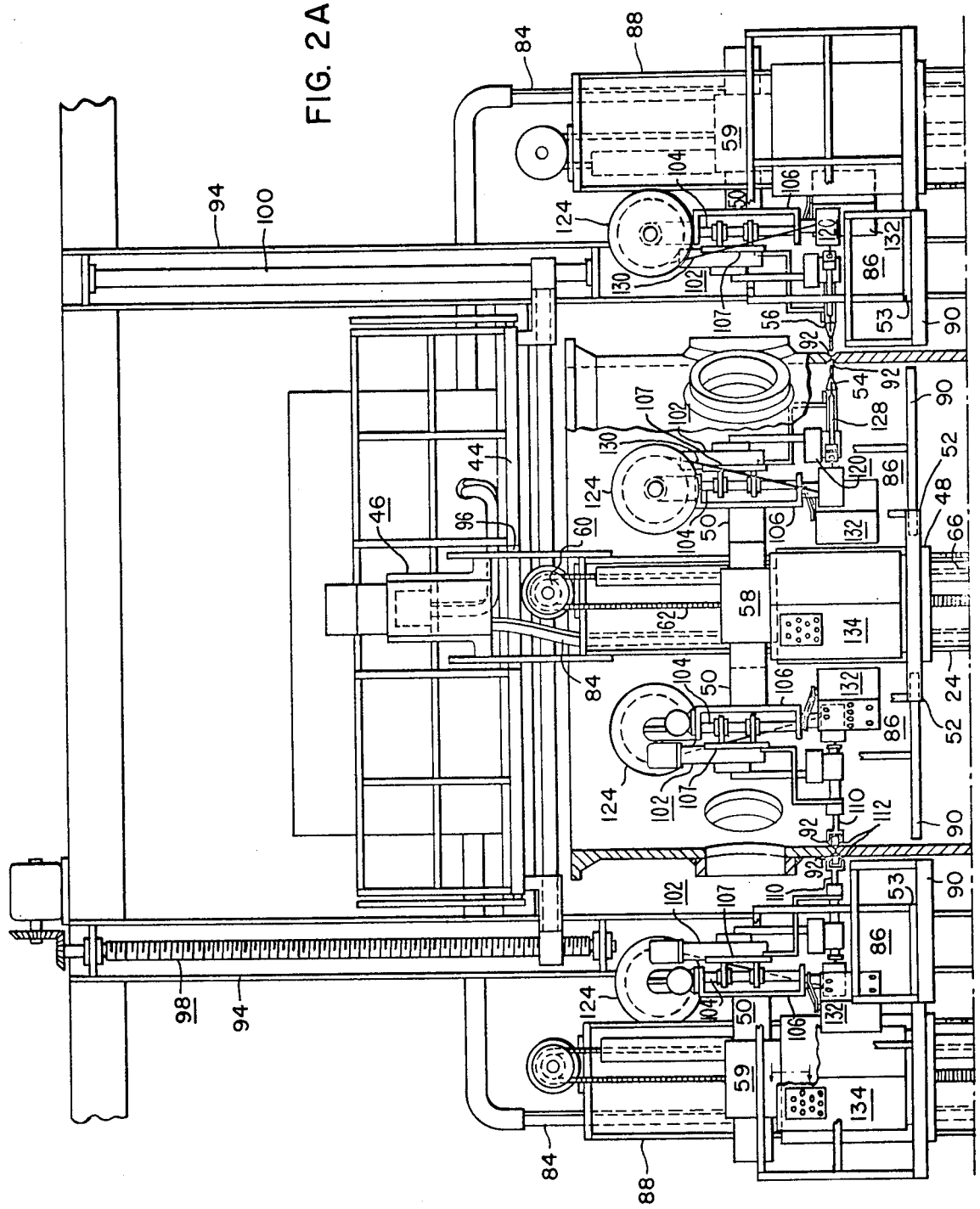

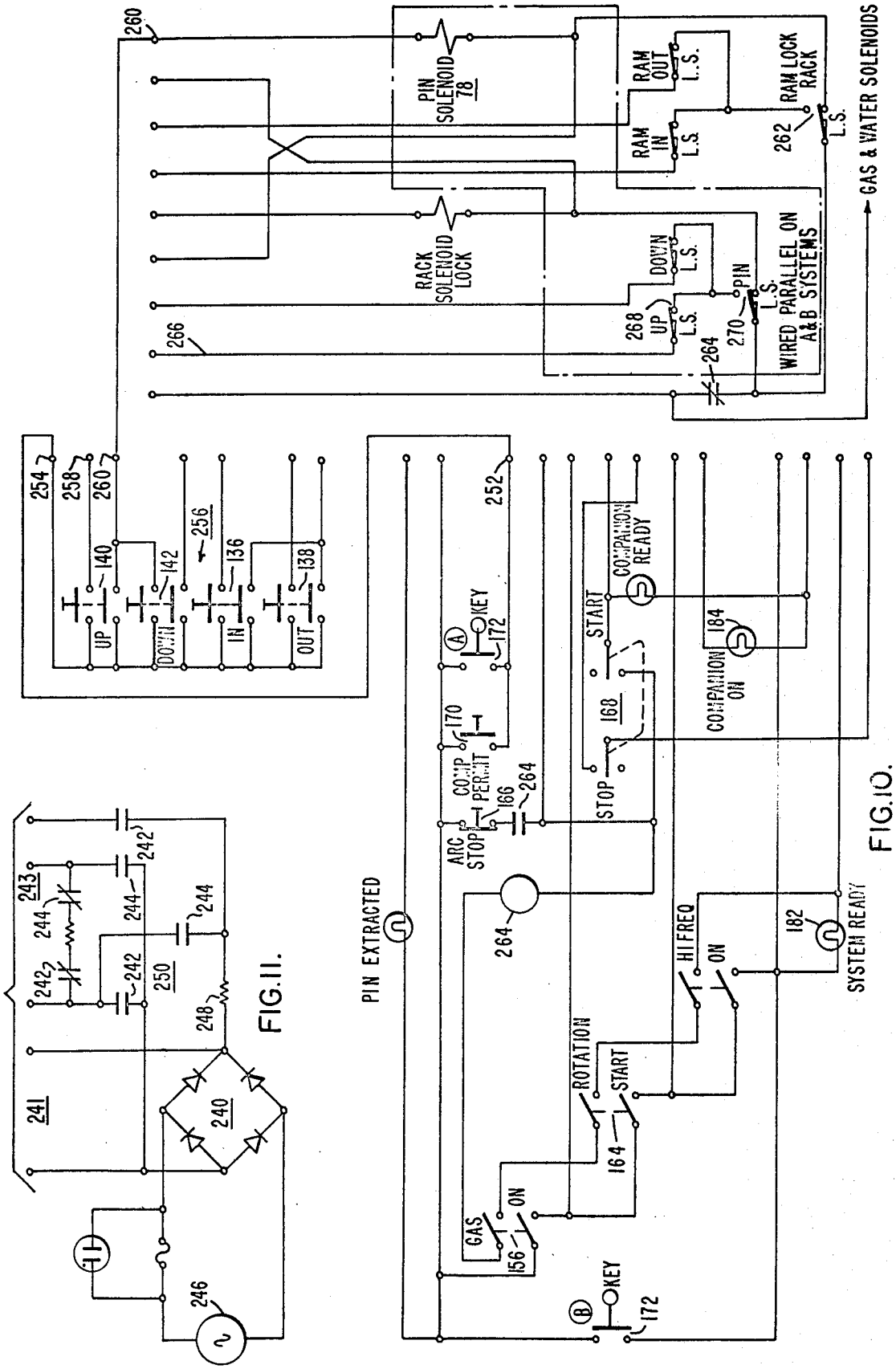

AUTOMATIC HOT FILLER WIRE WELDING METHOD AND APPARATUS

BACKGROUND OF THE INVENTION

1. Field of the Invention

This invention pertains generally to welding methods and apparatus, and more particularly, to such methods and apparatus that employ preheated filler material.

2. Description of the Prior Art

Nuclear reactor core barrel assemblies, because of their unusual size and weight, create unique welding problems in their construction that are not normally encountered in most manufacturing operations. The core barrel assemblies in pressurized water nuclear reactors are used to support the reactor internals and core components and are in turn supported by an upper flange on the internal ledge at the uppermost portion of the reactor pressure vessel. Generally, such reactor core barrel assemblies are constructed from four separate components: an upper, annular, circular flange; an upper, cylindrical, tubular barrel; a lower, cylindrical, tubular barrel; and a lower core support plate — all of which are welded together. The assembly of the upper flange/upper core barrel section/lower core barrel section defines a generally tubular member, one end of which is substantially closed by the lower core support plate. The approximate height of a total representative assembly is in the order of 9.3 meters, with an inside diameter of approximately 3.7 meters. The general thickness of the upper and lower barrel sections amounts to a little over 5.08 centimeters. While the lower core support plate only occupies approximately a little over 50.8 centimeters of the total height of the core barrel assembly, it accounts for a substantial amount of the total weight, contributing approximately 27.3 metric tons to the entire assembly weight of approximately 72.6 metric tons.

The lower two circumferential weld joints which couple the the core support plate to the lower barrel portion and the lower barrel portion to the upper barrel are critically important in that high quality welds must be attained to maintain precise dimensional control of the barrel cylinders as they are welded. For example, the final design requires that: the longitudinal shrinkage between any two barrel cylinders or similar pieces be controlled within a 0.102 centimeter tolerance zone; the parallelism of the top flange relative to the core support be maintained within a 0.05 centimeter tolerance during longitudinal shrinkage; and the diametrical shrinkage be constant throughout the 360° weld for each weld seam to minimize rotational distortion and to maintain coincidence of the $x$-$y$ axes between the top flange and the core support within 0.050 centimeters.

Because of the tight design control stipulated, the core barrel welds are attained with the barrel cylinders in the vertical position, with welding accomplished in the horizontal plane. Conventional welding tolerances and a better weight distribution between the various components would permit a more standard welding practice of horizontally rolling the cylinders beneath the welding torch. However, it can be appreciated from the representative dimensions given above (although it should be understood that the dimensions will vary depending upon the size of the particular nuclear reactor under consideration) that such conventional techniques will most likely result in severe distortions in the alignment of the various components after the welds are complete. Such distortions are intolerable in the unique structure of a nuclear reactor.

To meet the aforementioned criteria in accordance with the prior art, welding has been accomplished by placing the barrel sections with their axes vertical, one barrel on the other. Manual welding techniques have been employed at various locations around the weld seam with the objective of producing an X-ray quality weld, yet control weld shrinkage and distortion. However, difficulty has been generally encountered in producing welds which meet both the quality and dimensional criteria because of the difficulty of simultaneously and uniformly distributing heat around each of the welding locations. Many repairs are normally necessary, and the time and cost expended are extensive. Local repairs to defective welds can result in further unacceptable distortions.

A recent innovation in the art of welding has provided for preheating the filler material prior to being deposited at the weld zone where it is fused with the workpiece by a separate welding torch. However, the quality of welds produced from this innovation has been found to vary extensively as a function of a number of the welding parameters, i.e. the amount of heat imparted to preheat the filler material and the speed of deposit. Reproducibility of quality welds obtained with this process has proved difficult because of a number of variables that have to be simultaneously controlled.

Accordingly, an improved method is desired that will produce high quality welds in large barrel cylinders and other components in a very precise, predictable and controlled manner. In addition, such a method must control vertical distortion and insure reproducibility.

SUMMARY OF THE INVENTION

Basically, this invention overcomes the difficulties experienced by the prior art by providing a welding method and apparatus capable of producing high quality, reproducible weld joints.

In accordance with this invention, filler material is preheated and fed onto a weld zone in a programmably controlled manner. The deposition rate is automatically controlled as a function of the power imparted to preheat the filler material and the filler feed speed which are interrelated, independent variables whose dependency is preestablished in a programmed manner through a closed loop system. The deposited material is fused at the weld seam by a separate welding torch to form an integral weldment.

Desirably, in an application to welding an extended weld seam wherein the weld zone is moved along the seam, the power imparted to fuse the weld joint is automatically controlled as a function of the speed of movement of the weld zone along the seam.

In another embodiment in an application to welding cylindrical members along a designated circumferential weld seam, in accordance with this invention substantially identical welds are produced at a plurality of spaced weld zones along the weld seam symmetrically situated about an axis bisecting the axis of revolution of the member. The substantially identical welds are produced by automatically controlling and establishing in a programmed manner a substantially identical ratio of heat input to volume of deposited metal along the weld seam at each of the weld zones at any given point in time. To establish this ratio, the power imparted to fuse the weld joint is programmably controlled as a function of each weld pass and the speed and relative position of each weld zone along the seam; and the power imparted to each weld zone is compared with the power imparted to the remaining zones along the seam and any difference automatically controlled to assure the heat input at each welding location is the same. At the same time, the filler material deposition rate at each welding location is automatically, programmably, controlled as a function of each weld pass, the speed of movement of the weld zone and the deposition rate at the remaining zones along the seam, and the preheat power is controlled as a function of the corresponding filler material feed speed. Thus, in this manner, the welding power, speed of filler material feed and the heat imparted to the filler material can be programmably, variably controlled automatically over a number of passes to establish the identical ratio of heat input versus volume of deposited metal at each welding location at any given point in time to assure the identical quality and reproducibility of each weld.

BRIEF DESCRIPTION OF THE DRAWINGS

For a better understanding of the invention, reference may be had to the preferred embodiment, exemplary of the invention, shown in the accompanying drawings, in which:

FIG. 2A is a perspective view of the upper portion of a welding fixture which can be employed to perform one embodiment of this invention, with a reactor core barrel in position;

FIG. 10 is a schematic diagram of control circuitry employed to establish coarse horizontal and vertical positioning of the weld heads of this invention;

FIG. 11 is a schematic diagram of the tracking control circuitry employed to maintain alignment of each welding torch with the weld groove;

DESCRIPTION OF THE PREFERRED EMBODIMENT

To meet the precise design criteria and welding tolerances required for a nuclear reactor core barrel and other components requiring such exacting standards, this invention provides a method and apparatus designed with the necessary process equipment and steps, completely integrated into an automatic closed loop system, to consistently and precisely maintain welding control on any number of welding heads to establish the identical ratio of heat input to volume of deposited metal at each welding location at the same time. In addition, the welds provided by each of the welding heads in this manner are consistently reproducible. In this way, shrinkage and distortion of the workpiece can be controlled. The ratio of heat input to volume of deposited metal is tightly controlled and maintained identical at the welding locations by close loop electronic feedback controls which establish and coordinate critical welding parameters in a programmed, controlled manner.

Figure 1:
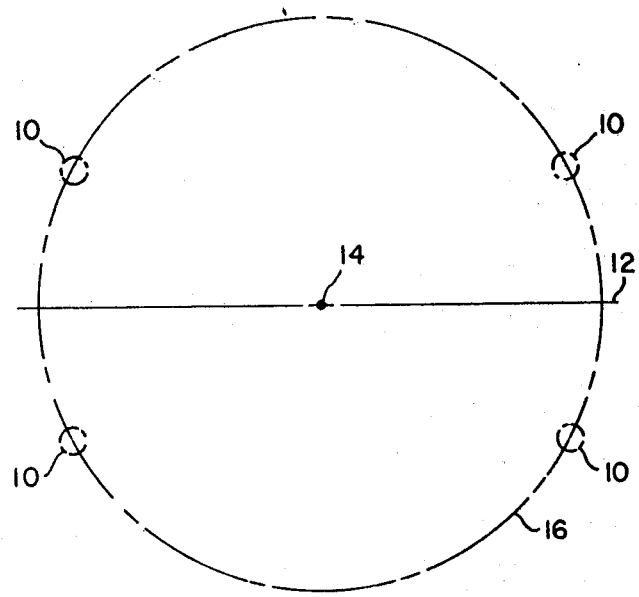
FIG. 1 is a schematic view of exemplary welding locations which can be utilized in accordance with this invention.
Figure 2B:
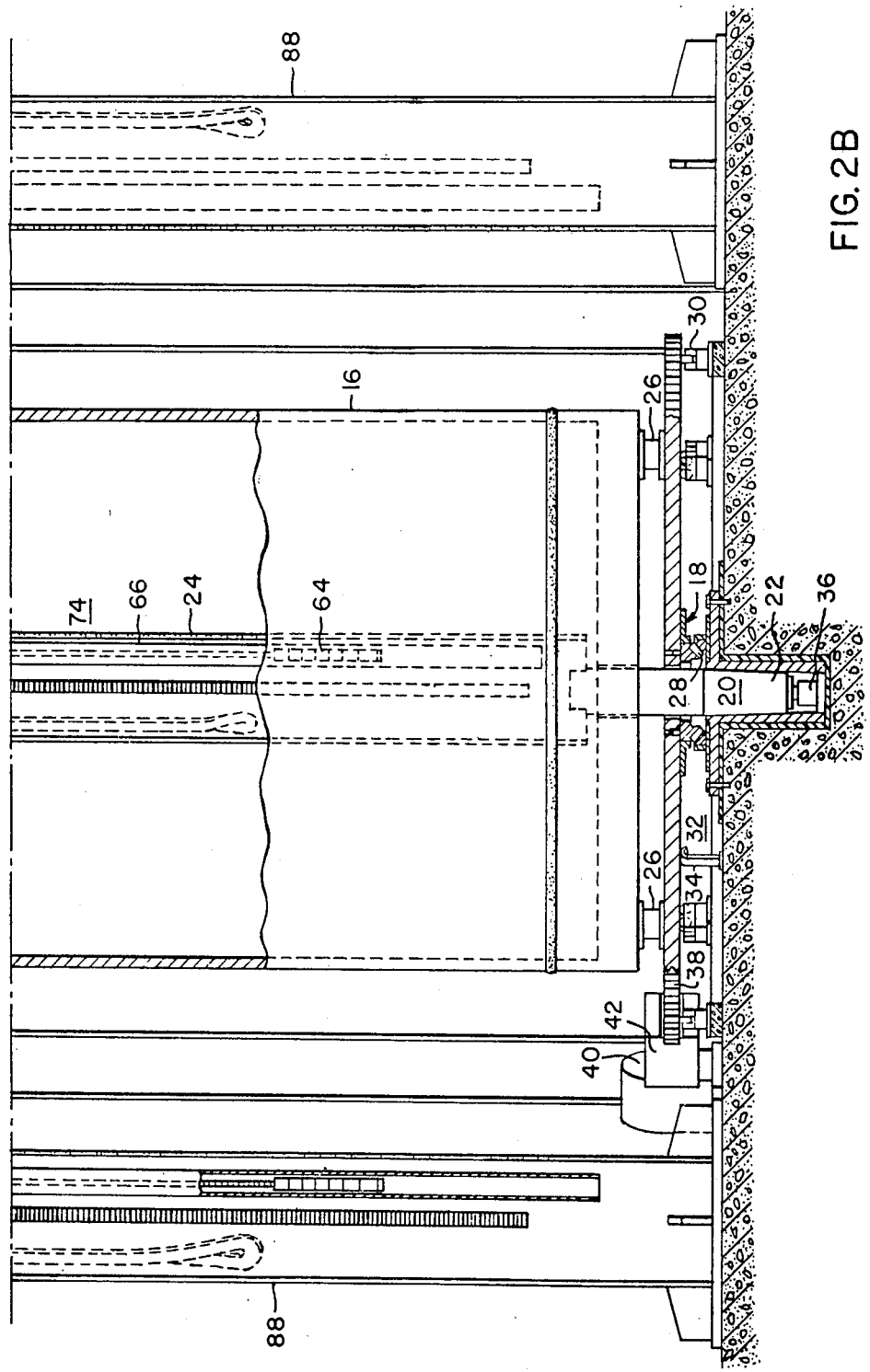
FIG. 2B is a perspective view of the lower portion of the welding fixture of FIG. 2A.

An exemplary welding fixture which is specifically suitable for carrying out the method of the welding system of this invention in an application to welding reactor core barrel assemblies is fully illustrated in FIGS. 2A and 2B. To control shrinkage and distortion in accordance with this invention a plurality of welding heads are respectively positioned around the weld seam at corresponding points symmetrically spaced about an axis bisecting the axis of rotation of the cylindrical workpiece to be welded. For example, as illustrated in FIG. 1, in accordance with this invention the welding positions 10 can be situated at locations symmetrically spaced about an axis 12 bisecting the axis 14 of the core barrel 16. The ratio of heat input to volume of deposited metal is maintained identical at the welding locations by electronic feedback controls which establish and coordinate welding parameters such as: arc voltage, filler material feed, filler material preheat current, weld current, and rotational turntable speed. In addition, weld seam tracking and automatic weld head positioning are provided to assure that the welding heads maintain relative alignment with the circumferential weld seam.

Desirably, as illustrated in FIGS. 2A and 2B, the major axis at the center line of the core barrel assemblies is positioned perpendicular to the face of a rotating table or base member. In this example, two external outrigger and one removable internal center column supports are employed to locate welding stations 180° apart at either the interior or exterior of the barrel, or both. FIGS. 2A and 2B respectively show the upper and lower sections of an exemplary fixture for practicing this invention, which includes the rotating turntable or base member 18 with a core barrel 16 in place, positioned concentric with the axis of rotation of the table.

A hole or socket 20 extends through and beneath the center of the table to permit a locating pin 22 for the center column 24 to be seated and supported therein.

The turntable for such an application is designed to support concentric loads of approximately 181.6 metric tons, point loading of 181.6 metric tons under static conditions and dynamic loading of 181.6 metric tons concentric. The turntable diameter in this example is approximately 5.08 meters.

The upper surface of the turntable is machined and contains a number of holes for attachment of boring mill type chuck jaws, or stanchions 26, as illustrated in FIG. 2B, for positioning the core barrel concentric with the center line of the turntable.

The undersurface of the table 18 is machined to accept a self-aligning thrust bearing 28. A circular area at the periphery of the lower surface is machined to accept outboard bearings 30 and wear plates 32, which also serve as a raceway for electrical ground shoes 34. The lower bearing support incorporates the tapered socket 20 for locating the center column pin 22 in the center of the table. A portion of the socket housing extends below floor level a distance sufficient to provide enough depth for column stability. In order to facilitate the removal of the center column, a 90 metric ton hydraulic jack 36 is located in the base of the socket. The jack is operated by means external to the table area to unseat the column from its taper lock fit when removal of the column is desired.

Desirably, two 2,000 amp capacity, spring-loaded ground shoe assemblies 34 are provided to complete the electrical welding grounding circuit and to protect the table bearing from welding currents.

The rotational drive for the turntable is provided via a precision spur gear 38 which extends around the periphery of the table and delivers a smooth, regulated rotational speed in a continuously adjustable speed range, for example, from 0.0053 to 0.058 rpm ± 2% as controlled by the power drive motor 40 located adjacent the table periphery. Power is transferred from the motor to the table gear by the gear box 42 shown in FIG. 2B.

The center column 24 is a fabricated manipulator mast which is positioned inside the core barrel assemblies 16 and located on the lower end with the pin support 22. The upper end of the center column is stabilized by an auxiliary platform 44 which is supported peripheral of the turntable. The upper end of the column is fitted with a tapered plug and sleeve 46 to align with a locking ring on the auxiliary stabilizer.

The center column 24 has a vertical travel powered manipulator saddle 48 fitted with two weld arms or rams 50 and an operation support platform 52. Both ram designs are identical and are constructed with the proper offsets to place the welding torches 54 supported at the horizontal extensions of each ram 50 on a common center line 180° apart and in line with that of outrigger column torches 56.

The platform/saddle assembly, or carriage 58 lift is accomplished by use of an AC brake motor coupled to a reducer, which motor's two double sprocket assemblies 60 which are arranged to communicate with a chain drive 62. The chain 62 is affixed at one end to the carriage 58 and at the other end to counterweight 64 enclosed within a tubular housing 66 supported along the column.

The carriage 58 is a fabricated box structure designed to minimize torsional twist. Precision roller cluster assemblies 68 (shown in FIG. 8) are mounted on the carriage and grip machine ways 70 on the center column to assure proper alignment of the carriage and rams.

Figure 3:
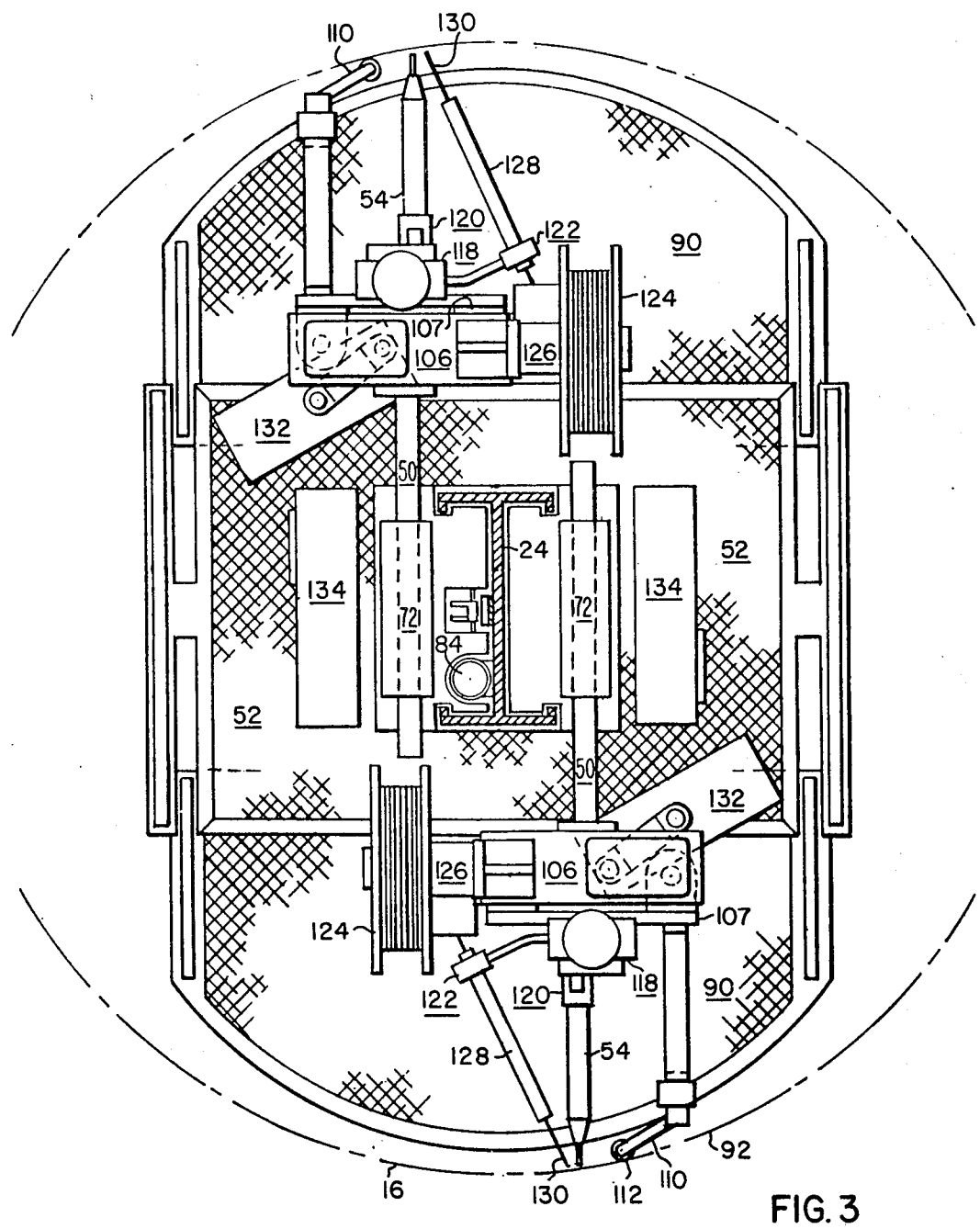
FIG. 3 is a top view of the central column operator control station of FIG. 2A.

Each ram 50 includes a fabricated box section 72 (FIG. 3) driven by a gear rack that is fastened to the side of the rams. Ram travel in this example is approximately 90 centimeters. The gear rack of the ram is pinion driven by an AC brake motor. The drive motor is coupled to a gear reducer and pinion, driving the ram rack. For full versatility, the drive mechanism is connected to be reversible. For assuring proper position locking, a rack lock is included formed from a section of rack mating with the rack on the ram.

Figure 4:
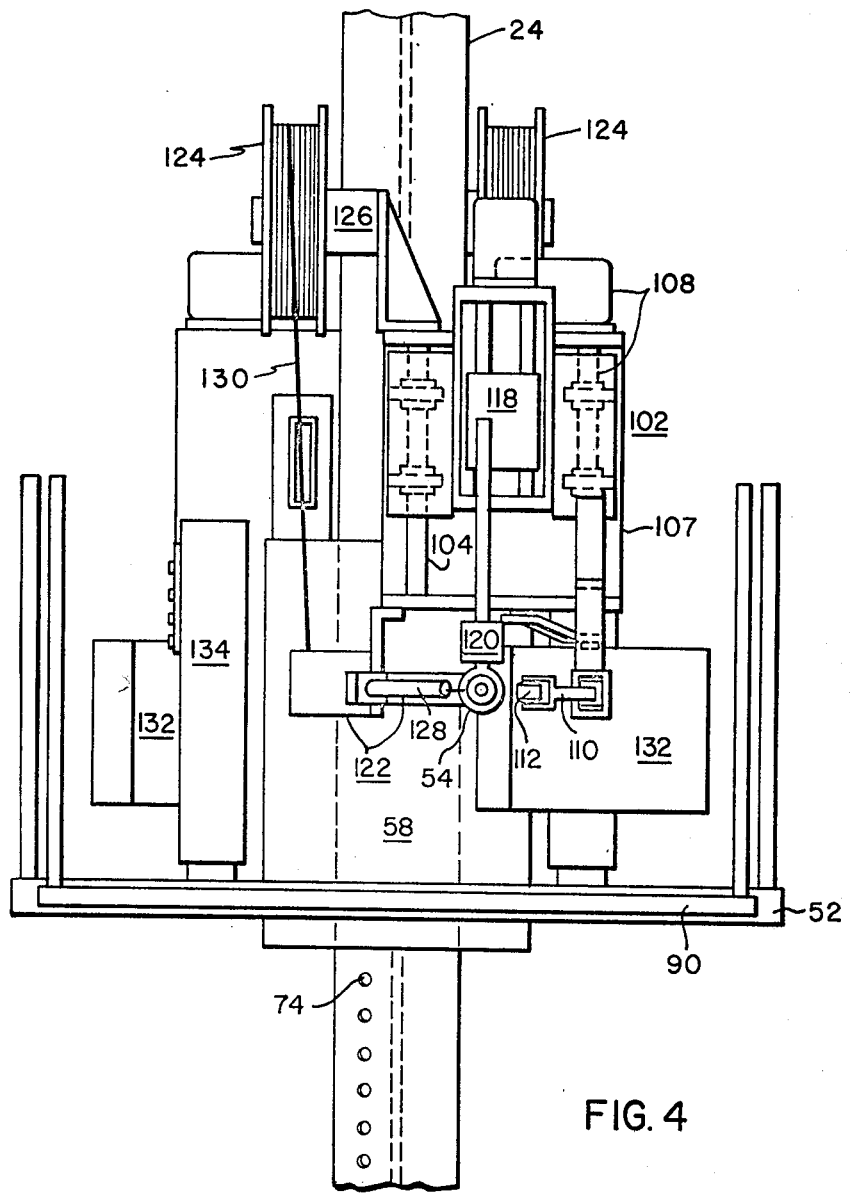
FIG. 4 is a side view of the central column operator control station of FIG. 2A.
Figure 6:
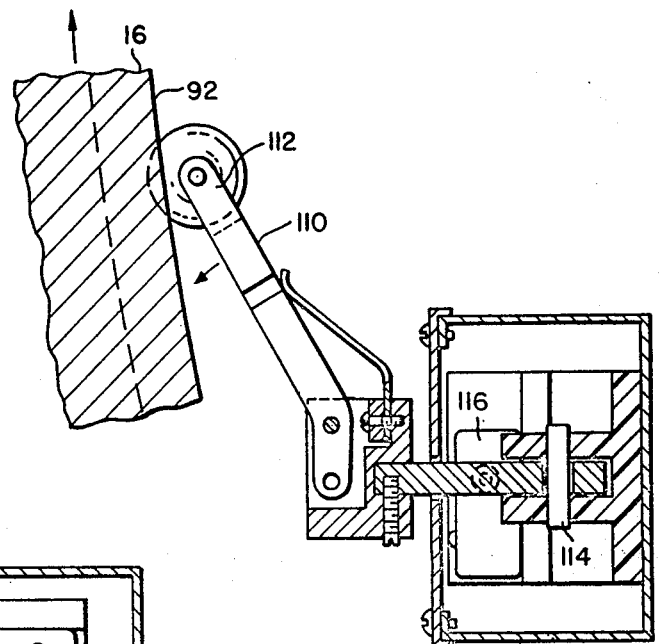
FIG. 6 is a top view of the welding head tracking control unit of FIG. 2A.
Figure 7:
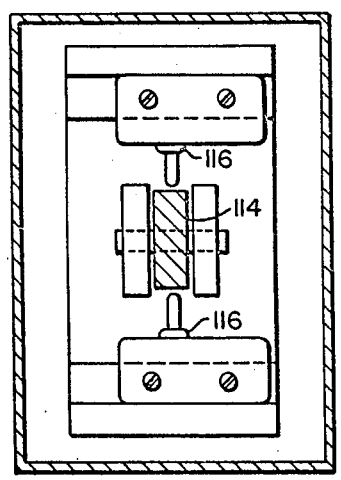
FIG. 7 is a front, partially sectional view of the welding head tracking control unit of FIG. 2A.
Figure 5:
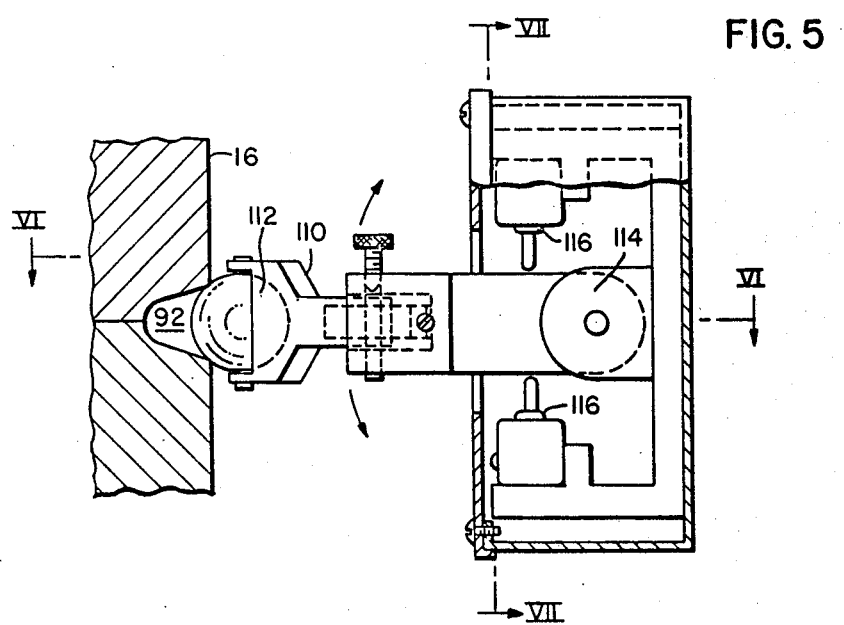
FIG. 5 is a side view of the welding head tracking control unit of FIG. 2A.
Figure 8:
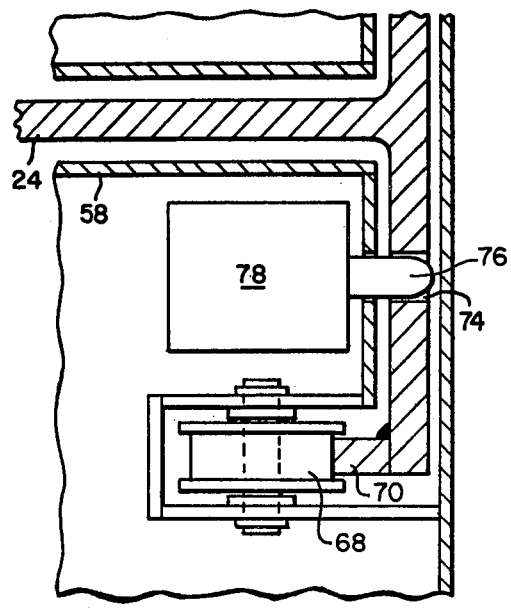
FIG. 8 is a top, partially sectional view of the welding carriage guide of FIG. 2A.

A series of vertically spaced holes 74, located approximately every 10 centimeters on the center column of the exemplary fixture of FIGS. 2A and 2B (shown in better detail in the side view of the carriage provided in FIG. 4), are engaged by a solenoid operated pin 76 shown in FIG. 8, which provides a positive mechanical lock against dropping of the carriage due to chain or drive mechanism failure in the static condition. The operating circuitry is so arranged that the carriage drive will continue in motion until a pinhole 74 is engaged. Additional electrical interlocks to be described prevent operation of the welding equipment until the pin is securely in position.

The power and control cables 84 (illustrated in FIGS. 2A and 2B) attach at the top of the column and loop down to the carriage. In addition to the normal control cables and welding leads, gas conduits are mounted on each of the carriages to convey inert gas from a source to the welding torch locations.

Two outrigger floor mounted columns 88 are located on either side of the turntable and are essentially identical in structural design to the center column 24 in most respects, except, for example, for the utilization of a single ram. The rams are located diametrically opposed to each other on the same center line as the welding torches of the center column stations.

A weld head assembly 102 is attached to the end of each ram 50 by means of an adapter with each assembly being identical and interchangeable among rams. A six inch travel vertical slide 104 (shown in FIGS. 2A and 4) is attached to the adapter 106 through a base plate 107 and provides fine vertical adjustment of the head assembly. Movement of the slide is accomplished through a wormgear/motor assembly 108. When the tracking system control is set in "auto" position, vertical adjustment of each welding torch 54 and 56 to maintain alignment with the weld seam 92 is accomplished through the vertical slide, as will be described in the explanation of the tracking system which follows.

The tracking system (shown in FIGS. 2A, 3, 4, 5, 6 and 7) which maintains vertical alignment of the welding torches 54 and 56 with the weld seam 92, includes a spring-loaded arm 110 which laterally extends from the base plate 107 into contact with the weld seam 92. A ball and socket 112 is provided at the extended end of the tracking arm 110 which rides directly within the weld seam 92. Support of the tracking arm 110 by the base plate 107 is provided through a socket 114 which permits the vertical movement of the tracking arm with displacements in the weld groove as the weld groove travels with rotation of the turntable. Vertical displacement of the tracking arm is sensed by microswitches 116 on either side thereof which translate the vertical motion into an electrical output representative of the direction of displacement. This output is then used to control the motor/wormgear assembly 108 to place the welding head back in alignment with the weld seam. Desirably, the ball and socket 112 of the tracking arm 110 are located as close as possible to the welding head without obstructing the operator's visual access to the weld. A small time delay circuit providing a time delay equal to the time required for the weld seam to travel the distance between the weld torch and the ball and socket of the tracking arm can be employed to interpose this delay time before the motor/wormgear assembly 108 is activated to realign the weld head. When a change in turntable speed is desired, a close loop tie between the tracker time delay and turntable speed will be required to vary the delay in accordance with changes in the rotational speed of the member being welded. Thus, a closed loop control circuit is provided which constantly corrects the alignment of the weld head to the seam.

Attached to the vertical slide 104 is a weld head oscillator 118, such as an Auto Arc model 4610C, manufactured by Auto Arc-Weld Manufacturing Company, Cleveland, Ohio. In this example, the oscillator 118 which is best shown in FIG. 4, provides up to 7.6 centimeters of controlled stroke with an adjustable dwell at either end that enables the torch to pause at the extremities of oscillation for a programmed period of time. THe width as well as the centerline of oscillation is arranged to be programmed to vary as a function of the weld pass being undertaken.

Attached to the oscillator 118 in this example is an arc voltage control head 120, such as the Linde Model No. HWH-3, manufactured by Linde Division of Union Carbide Corporation, New York, N.Y. This head is designed for automatic welding of shapes which provide limited work space. The head is used in this example with a HW-27 Linde torch. The arc voltage control head 120 consists of a reversible stepping motor, ball screw shaft assembly, recirculating ball screw clamp assembly, and precision slide assembly. The stepping motor rotates the shaft of the ball screw shaft assembly, which in turn, raises and lowers the recirculating ball screw assembly. The moving portion of the slide assembly is doweled directly to the recirculating ball screw assembly, thus it is raised and lowered by the clamp assembly which supports the welding torch. The torch mounting adapter is bolted directly to the moving portion of the slide. The differential amplifier associated with the arc voltage control head 120 senses the voltage between the torch and the workpiece and compares this voltage to a preselected voltage representative of the desired arc distance between the torch and the workpiece seam. For closed loop operation of a plurality of welding heads, the preselected voltage to each arc voltage control unit can be generated from a single source rather than programmed individually at each welding location as described hereinafter. If the actual voltage between the workpiece and the torch deviates from the preselected voltage, the stepping motor is activated to relocate the torch at the proper distance from the weld. Thus, a constant and substantially identical arc voltage is maintained at each welding location throughout the welding operation.

The welding torch is provided as an integral part of each welding assembly. The torch body contains an integral gas lens which provides a stable stream of shielding gas with cup elevations of up to 2.54 centimeters, for example, to provide good visibility in the weld area. The torch and power cable are water-cooled through integral water passages communicated from the overhead support platform 44 of the center column 24.

A hot wire feeder assembly 122 (best shown in FIGS. 3 and 4) is connected adjacent to the welding torch to provide a source of preheated filler material from the spool 124 to the weld seam. Basically, the hot wire feeder includes a spool of filler material 124 which is driven by a high speed wire roller drive 126 through a contact tube 128 to the weld seam on the workpiece at a location proximate and behind the torch with respect to the direction of travel of the tubular member. An AC power supply is connected between the workpiece 16 and the contact tube 128 and communicates the AC current through the filler wire 130, thereby electrically resistant heating the wire prior to deposit in the weld seam. An example of such a system is described in the patent to A. F. Manz, No. 3,122,629, issued Feb. 25, 1964.

As will be appreciated from the description to be provided hereinafter, the standard hot wire feed is modified by this invention to automatically, variably control the amount of filler material deposited in the weld seam in a programmed manner as a function of the speed of the workpiece and the progressive weld passes. In addition, the amount of AC current communicated to heat the filler wire is automatically regulated as a function of the speed at which the filler wire is being deposited within the weld seam.

Figure 9:
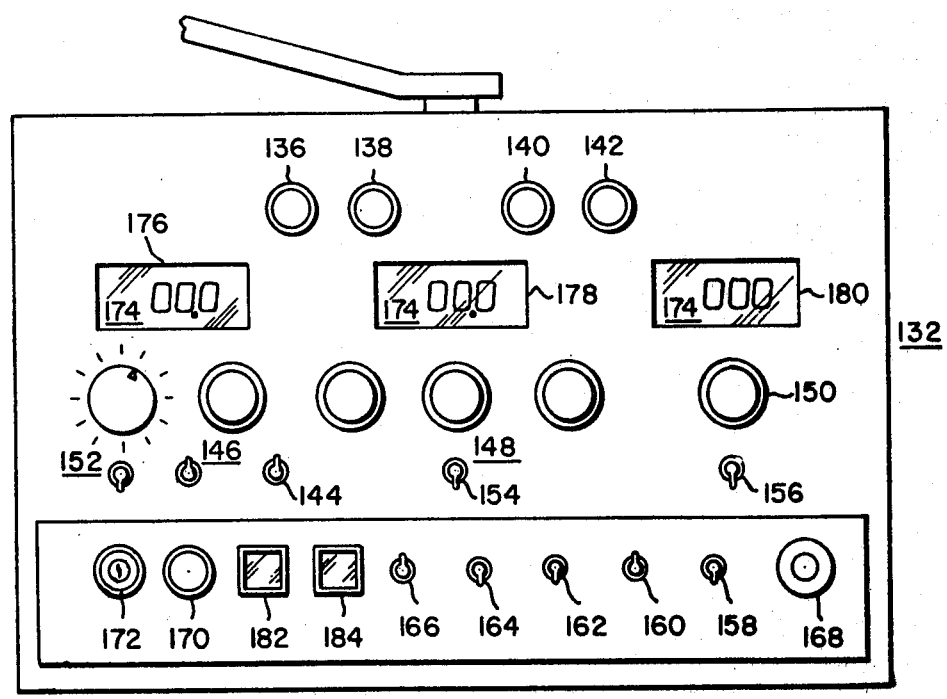
FIG. 9 is a front view of one welding control pendant illustrated in FIG. 2A.

To establish the capability of direct control over the operating weld parameters, where intervention to the automatic mode of operation of this invention, to be described, proves advisable. Each manipulator ram 50 is provided with an operator control panel 132 identical and interchangeable with the other control panels associated with the other welding assemblies. Each panel is designed to provide optimum placement of the controls for operational ease during welding as shown in FIG. 9. A second fixed control console 134 associated with each operator station is provided for those functions not normally needed during the actual welding operation.

The interchangeable panels 132 include controls for moving the ram in 136 and out 138; moving the saddle up 140 and down 142; adjusting the height of the welding head 144; adjusting the arc gap 146; coarse and fine current control 148 for heating the filler material; adjusting the DC welding current setting 150; implementing the oscillator function 152; implementing the slope for the filler material feed 154; gas purge 156; automatic voltage control of the head 158; automatic wire feed 160; slope of the current to the welding head 162; rotation of the base member 164; weld start and stop 166; and an emergency switch 168 for shutting down the equipment. A number of these controls are not necessary when the automatic closed loop systems of the embodiment to be described are in use, but are desired for individual weld zone trim or override. In addition, a companion control switch 170 is provided that prevents movement of the center column operator station unless a command is issued at both center column operator stations. A key switch 172 is provided to disengage the companion logic control to enable movement of the station with only one operator. In addition, the controls provided on the control panel 132, direct digital meter readouts 174 are provided, as illustrated in FIG. 9 for the arc voltage 176, wire feed speed 178, and the welding current 180. The controls provided on the fixed console 134 include: the oscillator programmed function settings; the programmed wire feed speed settings; arc voltage sensitivity control; post flow for gas flow after shutdown; pump water control; and control of rotational direction and speed of the base member.

Before welding of a particular core barrel can be implemented, the overhead platform 44 has to be moved off to the periphery of the turntable 18 and the center column 74 and has to be removed from its locking socket 22 by way of the hydraulic jack 36 and positioned off to the periphery to enable positioning of the core barrel segments which are supported on the stanchions 26. Once the core barrel has been situated centered about the centerline of the turntable 18, the center column 74 is replaced and the overhead platform is moved into position to provide support for the center column and enable operator access to the center welding platform.

Once the operator is in position, vertical motion of the carriage is initiated to align the welding torches with the weld seam by the up/down buttons 140 and 142 on the top of the interchangeable control panel (FIG. 9). When carriage movement on the center column is desired with two operators and the companion key switch 172 maintained in the companion position, one operator must depress the companion permit button 170 located adjacent the key switch on his control panel while the other operator selects the direction of travel before movement can begin. When there is only one operator on the center column, the key operated permit switch 172 (FIG. 9) on the unattended control station must be turned off. When movement in one direction is started, the operator holds the movement button depressed until he wishes movement to stop. When the operator releases the movement button, movement continues until the spring-loaded pin 76 (FIG. 8) drops into the next lock hole 74 on the column. The fine adjust of the vertical slide 104 (FIG. 4) must then be used to locate the torch within the welding groove.

Vertical motion on the outrigger columns is accomplished simply by pushing the desired motion button. The companion permit buttons are not necessary since movement on each outrigger column is independent. Though it should be appreciated that vertical motion on the outrigger column can be coordinated in the same manner as described for the central column to assure that each vertical column is at the same height.

An exemplary circuit for controlling vertical and horizontal ram motion is illustrated in FIG. 10. In order to clarify the following circuit description, assume that one operator control station, "A", on the center column is the prime operator and the other station, "B", is the companion. As previously explained, the circuitry for each station is identical and a simultaneous command must be issued at both operator stations on the center column before vertical motion can be achieved. It should be appreciated though, that any one of the four stations can be used as the prime operator with any second station being the companion.

A 115 volt AC power source is employed to energize the switching operation for controlling vertical and horizontal ram motions on the columns. When the companion permit switch 170 is energized, the 115 volt voltage source is fed to terminal 252 and back out to terminal 254 in the operator station "A". This terminal is fed to one side of all the vertical/horizontal motion switch blocks 256. In this instance, assume that the direction "UP" is selected which applies the 115 volts to terminals 258 and 260.

Terminal 260 is connected to one side of the pin extract solenoid 78. The pin extract solenoid 78 is employed to disengage the locking pin which fits in the vertical spaced holes 74 in the center column to secure the rams in the vertical position. The other side of the solenoid goes through the normally closed circuit 262 of the rack lock limit switch (which is used to lock the rams in position, as previously described), a normally closed contact of relay 264 to the other side of the 115 volt AC source. This causes the solenoid 78 to be actuated, which extracts the locking pin 76 from the socket 74, which in turn strikes the pin lock limit switch, throwing its contacts.

Terminal 258 is connected to the up and down connections on the vertical lift motor contactor (center column vertical lift). The up connection is a normally open set of contacts on the up coil which ties back to the 115 volt supply. The down connection is a normally closed set of contacts which ties to one side of the up contact coils. The other side of the up coil is wired to terminal 266 through the normally closed "UP" limit switch 268, normally open "locking pin" limit switch 270 (which is not closed because the pin has been extracted), to the other side of the 115 volt source. This circuit now energizes the up coil on the vertical lift motor which applies 440 volts AC three-phase to the center vertical motor drive providing up travel. It should be noted that at this point the hot 115 volt side of the up coil on the vertical motor drive is locked in through its normally open contacts and therefore, if either/or both the companion permit button and the up button is released, travel will continue until the other side of the up coil is open circuited. This is accomplished by the locking pin dropping into the next receiving hole, or the end of travel is reached and the UP limit switch is struck.

Horizontal movement of the center column rams is accomplished in the same manner as vertical movement, except that the in/out position buttons 136 and 138 (FIG. 9) are activated. Horizontal movement of the outrigger columns is motivated in the same manner.

After the operator stations are moved vertically and the rams horizontally to place the weld head assemblies 102 within proximity of the weld seam 92, the vertical slide 104 is actuated through its wormgear drive to provide fine vertical adjustment of the head assembly with the weld seam. Fine horizontal adjustment of each welding torch with the weld groove is accomplished through a commercially available item known as a touch-start relay, which is a product of the Linde Division of Union Carbide Corporation. Activation of the touch-start relay switch activates the voltage control head to move the tip of the tungsten welding torch towards the weld seam. Movement of the torch continues until contact is made, at which time the arc voltage control head withdraws the torch to a preselected distance from the seam. As preparatory to the welding operation, the lead end of the filler material at each hot wire torch in a multi-torch operation is located at a predetermined reference point so that each welding head assembly, tungsten electrode and wire feed tip, starts at the initiation of welding at the same distance from the workpiece.

In the automatic mode of operation of this invention, withdrawal of the tungsten electrode from the weld seam to the preselected distance from the workpiece by the voltage control head under the control of the touch-start relay, concurrently initiates rotation of the base member to a preselected speed; with a number of other essential welding steps similarly initiated in this manner in their proper sequence as can be appreciated from the description to follow.

The individual systems which comprise the improvement of this invention can better be understood from the following description of the systems application to a single weld pass single weld head operation with references to a multiple pass multiple head operation where appropriate. Finally, a multiple pass, multiple head operation will be considered in detail for a complete understanding of the programmed interaction of welding parameters automatically implemented by this invention.

Figure 12:
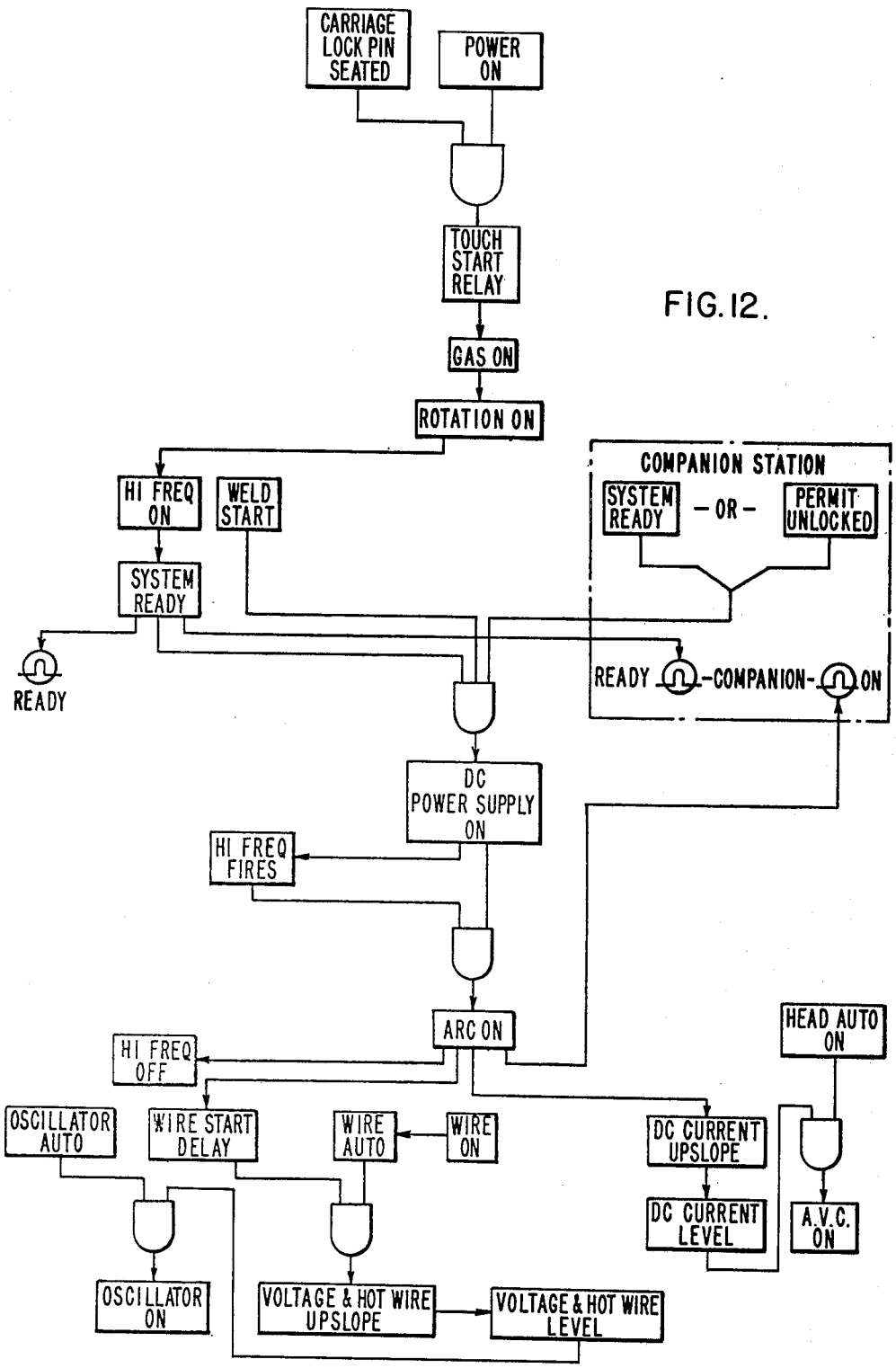
FIG. 12 is a block logic diagram of the programmed sequencing of the start-up parameters of this invention.

In order to assure that the requisite preliminary steps for welding are properly sequenced, this system includes logic circuitry which implements the specific actions that must be taken at the proper time and in the proper sequence before a DC arc is struck and the feed material is fed into the weld groove to establish the onset of a weldment. The main system logic is sequentially illustrated in FIG. 12. All inputs to each respective logic gate must occur concurrently before a corresponding output is provided. The gate outputs activate contacts which implement the corresponding welding functions. The logic sequence, which is implemented successively automatically as shown, performs the following steps in the order set forth before the welding operation begins:

1. The main power is turned on;
2. Verification is checked through appropriate electrical connection that the carriage lock pin which seats the rams on the main column is properly in position;
3. The touch-start relay is implemented to properly space the torch from the weld seam;
4. The gas which purges the air around the weld zone and creates an ionized atmosphere when an arc is struck is turned on;
5. Rotation of the base member is energized to its preset speed;
6. Energization of the high frequency arming switch is implemented.

Steps 4, 5 and 6 can be implemented concurrently by the appropriate closing of contacts activated by the touch-start relay once the welding head is properly positioned. At this point in the sequence the system is in the "ready" condition and the system light 182 (FIG. 9) on the operator's control panel is lit. The system is now ready to weld as a "single torch" operation, whether one or multiple torches are employed. The "weld start" switch 166 (FIG. 9) is now energized automatically once the high frequency is established and sensed by an appropriate AC sensor, which pulls in the DC power supply contactor and an arc between the tungsten electrode on the weld torch and the weld groove is initiated. The establishment of a DC arc is indicated by a continuity sensor output which opens the high frequency circuit and implements a number of other control functions to be described.

The following preset weld parameter sequence begins automatically when the aforegoing steps are accomplished in their proper order:

1. The wire feed delay is activated;
2. The automatic voltage control head delay is activated;
3. The DC current up slope is initiated;
4. Wire feed is initiated;
5. Oscillation is begun; and
6. Arc voltage control is initiated.

As previously stated, the filler material is resistance heated by an AC current communicated through the filler material to the workpiece at the point of contact with the weld groove. However, preheat cannot be imparted to the filler material until the AC circuit is closed by contact of the filler material with the weld groove, which is also determined through use of a current continuity sensor. Accordingly, contact of the filler material with the weld groove indicates the start of the weldment, which in turn, through the output of the continuity sensor, activates a rotational degree counter driven by the drive for the rotating base member. As will be appreciated hereinafter, the outputs of the degree of rotation counter and the continuity sensors are employed to control the commencement and termination of a number of the welding steps automatically.

As soon as a DC arc is struck, the DC weld current is up-sloped at a given rate established by a programmed integration circuit connected to control the firing of an SCR bridge to supply a DC weld current output, which at the initiation of a weld pass slopes from a negligible level to a programmed weld current level. At the time the DC current reaches its programmed operating level the automatic voltage control, which controls the distance between the tungsten electrode and the weld groove, is activated to maintain a preset arc voltage across the gap.

Concurrent with the DC current up-slope, after a slight delay initiated at the moment an arc-on condition is reached, the filler material feed starts inching towards the workpiece, and upon contact, as indicated by the AC continuity sensor, up-slopes until a programmed feed rate is achieved. The preheat current for preheating the filler material prior to its deposit within the weld zone is up-sloped at the time contact is made with the workpiece, concurrent with the up-slope in feed rate, until a preselected programmed hot wire operating power level is achieved. Each of the slope circuits are formed similar to the DC weld current control described above. The oscillator function is delayed until the hot wire feed and preheat current have reached their respective operating levels in order to avoid overly thinning out the weld deposit. As can be appreciated from the exemplary weld groove illustrated in FIG. 14, at the initiation of welding at the point where the feed wire makes contact with the workpiece the weld head is aligned at the center of the weld groove 500 and is maintained in that position until the programmed operating level of wire feed, DC weld current and wire preheat current is achieved. At the moment the operating parameters have been reached, the oscillator moves the head through a fixed width oscillation path about the center 500 that spreads the weldment over the width of the weld groove. In a single torch operation, oscillation is continued for the remainder of the 360° rotation of the base member to the point of onset of the weld where up-slope was implemented. At this point, the oscillations cease, the weld head recenters and the operating parameters are sloped-down.

The foregoing description describes a single pass operation. Alternatively, where the width of oscillation is capable of covering the full width of the weld groove through a number of passes, the operating parameters are maintained through each of the passes. Slope-down is only effected after the last pass at a location along the weld groove which corresponds to the point where welding was initiated for the continuous number of passes just completed. For example, for the weld groove illustrated in FIG. 14, four passes "a", "b", "c", and "d" could be completed before oscillation would have to cease and slope-down initiated.

The start of oscillation is triggered by each of the operating parameters reaching their programmed value; and the point of cessation of oscillation occurs after a programmed number of degrees has been traversed around the weld seam, as identified by the rotation sensor. Thus, in accordance with this invention each of the parameters is automatically implemented in a multipass operation by the appropriate closing of contacts activated by corresponding coded outputs of the various sensors monitoring the welding operation.

Where a weld groove enlarges to a point where the width of oscillation cannot cover the width of the groove in a single pass, such as in the illustrated pass "e", after slope-down is initiated in the previous pass "d", the weld head and thus the center of oscillation is displaced a preselected distance by a fine vertical adjustment of the oscillator drive screw initiated by an appropriate programmed output of the pass rotational counter which forms a part of the rotation sensor. Weld pass "e" is then initiated from up-slope through taper-down. At that time as identified by the rotational sensor, the head is again displaced to the programmed center of pass "f" and the process again repeated. Through each of these steps, the distance of the tungsten electrode from the weld will be maintained at a program value by the arc voltage control and touch-start relay control which are automatically implemented at the appropriate time in the same manner as previously described for the first weld pass.

Figure 15:
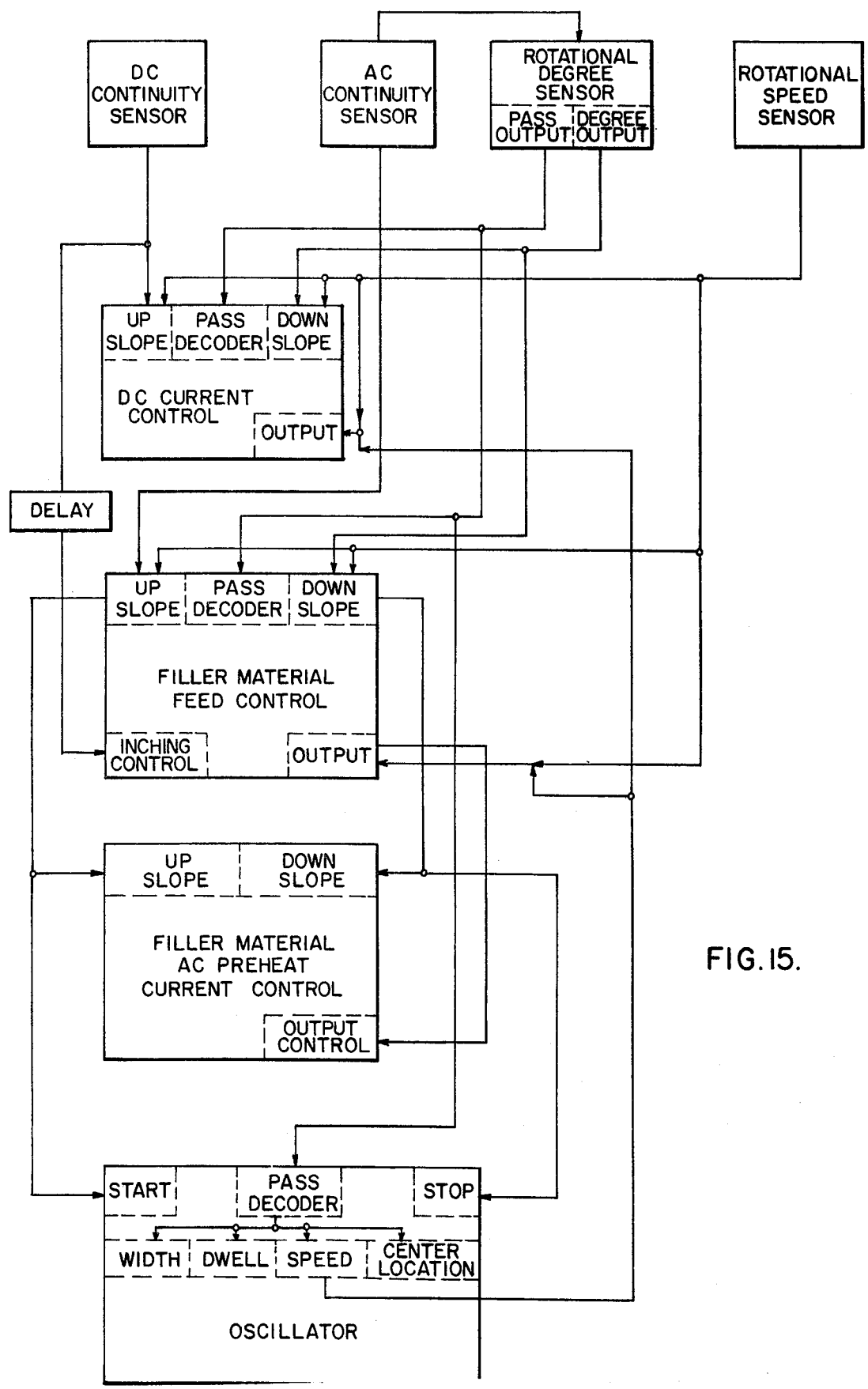
FIG. 15 is a block diagram of a closed loop system for controlling the programmed parameters of this invention.

As the weld groove is filled, the width to be covered will normally increase, requiring an additional number of passes per depth level to substantially uniformly increase the weld depth over the width of the weld, i.e., passes, "i", "j", and "k". After each pass taper-down is initiated and the head moved in the programmed manner just described. To accomplish this result with an increasing number of passes the rotational sensor (which is a conventional arrangement of counters and encoders) monitors each degree of rotation as well as each total pass providing corresponding coded outputs in each instance. The rotational sensor outputs enable each pass to be successively, separately programmed. While it should be appreciated that this type of programming arrangement would not normally be practical for a single weld operation, it is extremely beneficial where reproducibility and reliability are desired among a number of uniform weld grooves, such as are encountered in the manufacture of reactor core barrels. The basic system of this invention for establishing and coordinating control of the programmed weld variables is generally illustrated in block form in FIG. 15.

Ideally, a given number of passes and head displacements are programmed to completely fill the weld groove and provide a substantially uniform covering, i.e., passes "k", "l", "m", "n" and "o". The covering can then be machined for cosmetic purposes. However, in most situations the weld groove will at least be slightly out of round, and while a uniform depth can be achieved the final depth for overlap will be difficult to obtain. Therefore, it may be desirable to program a number of passes equal to the number required to substantially reach the top of the weld groove with the remaining overlap cover being supervised by direct operator intervention. Even in this case, while manually initiated, each pass can be carried out automatically, employing the method and apparatus described.

Figure 13:
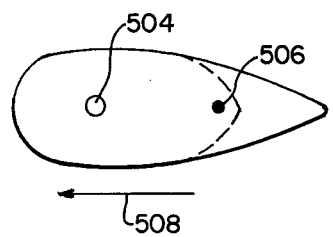
FIG. 13 is a schematic diagram of the desired weld puddle geometry established by this invention.

FIG. 13 illustrates an exemplary weld zone showing an ideal weld puddle which is formed from the proper combination of settings of the variable weld parameters, such as the DC arc current, filler material speed, AC preheat current to the filler material, speed of the workpiece and oscillation (width, dwell and centerline location). The tungsten electrode arc contacts the weld zone at 504 with the filler material being fed from the hot wire torch directly behind at point 506. Reference character 508 indicates the direction of rotation.

Figure 14:
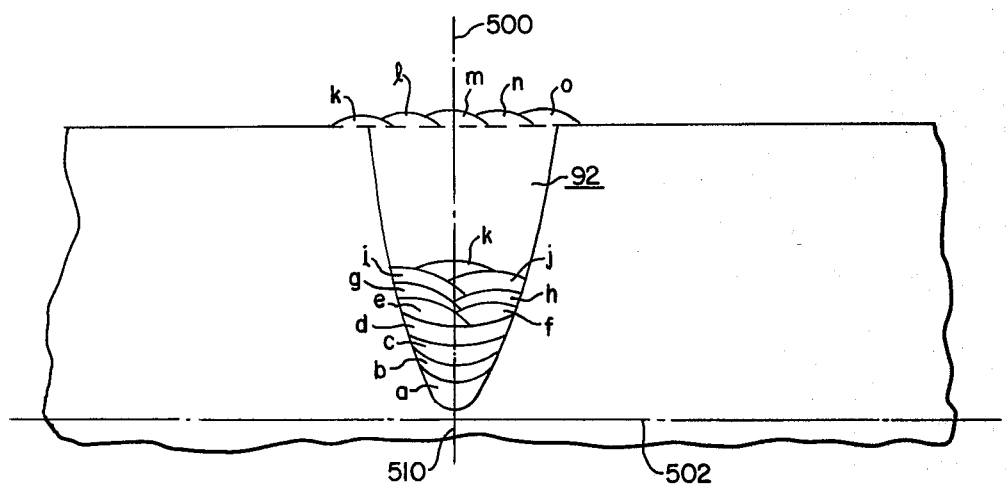
FIG. 14 is a sectional view of a weld groove illustrating the sequence of programmed passes of this invention.

Each of the program variables has a direct influence on the type and quality of the weld that can be achieved. For example, the DC arc is employed to heat the workpiece and melt the surface to a degree of penetration that will be dependent upon the weld pass under consideration so that a homogeneous joint is formed between the workpiece and the weldment. For example, during the first pass sufficient DC current is applied to penetrate as far as possible into the workpiece through the base metal, preferably to a point past the center line 502 illustrated in FIG. 14. It should be appreciated that FIG. 14 illustrates only one-half width of a mirror image section of a core barrel upper weld joint. Therefore, an identical but oppositely oriented weld groove exists on the other side of the line 502 mating at a point 510 with the base metal. Accordingly, sufficient penetration through the base metal is required to establish a homogeneous joint from the exterior surface of the barrel to the interior surface, throughout the entire depth of the weld grooves. However, on subsequent passes it is only desirable to penetrate a surface layer of the weldment previously supplied on the last pass to achieve continuity between passes without destroying the homogeneity of the joint between the base metal and the previous pass. Thus, other than during the tapering segments of a pass, it is normally sufficient for the DC current to remain constant for a given pass; presupposing there is no radical change in the other variables on which the DC current can depend.

Similarly, the filler material feed speed is a variable that is programmed in accordance with this invention to have the capability of varying from pass to pass, dependent to a degree on the DC current and the preheat provided to the filler material, the desired rate of deposit, the speed and width of oscillation, and the speed of the workpiece. A prime concern is the amount of filler material that can actually be melted within the weld groove without overly driving the puddle in the opposite direction to the direction of rotation. Of course, for efficiency the maximum rate of deposit is desired that can be established while maintaining a homogeneous weld.

The amount of AC preheat current that is imparted to the filler material will depend directly upon the filler material feed speed. The faster the speed of deposit of the filler material the more current that will be required to resistance heat the material to a point just below the melting temperature so that the filler material will melt upon contact with the workpiece.

The speed of the workpiece is of course an important variable too in that the faster the speed of rotation for a given rate of deposit of filler material and given DC weld power, the thinner the deposit and smaller the heating rate achieved per section of the workpiece. Thus, each of the aforegoing variables will have to, in some degree, be dependent upon the speed of the workpiece. Theoretically, with each of the variables tied in to the speed of the workpiece, in a completely close loop system, the entire welding process can be accelerated to its maximum rate of efficiency by increasing the speed of rotation once welding has been initiated. Of course, practically the maximum speed achievable does have limitations. However, the actual limitations on how fast the welding operation can proceed are far less than those encountered without such a close loop system.

Similarly, the speed of oscillation and the dwell applied at the extremities of oscillation will have an effect on each of the above programmed parameters. The implementation of oscillation or an increase in its speed has the same effect as an increase in the speed of rotation of the workpiece in thinning out the filler material deposit and lessening the heating rate per section of workpiece. Accordingly, the use of oscillation has to be taken into consideration in setting the program values for the weld current as well as the filler material feed and AC preheat current. As previously set forth, the width of oscillation and the location of the head center line during oscillation has to be programmed per pass to assure a uniform weld depth is achieved throughout the weld groove without affecting the homogeneity of the joint.

Referring back to FIG. 12, at the onset of the first pass after a DC arc is struck as identified by the DC continuity sensor, the DC current is up-sloped to its programmed weld value for the first pass. The DC continuity sensor is a state of the art circuit arrangement that identifies when the DC current path between the tungsten electrode and the workpiece is complete. The up-slope control includes an integration circuit which biases a state of the art SCR firing circuit employed to gate a full wave SCR bridge. The output of the bridge energizes the welding torch. An exemplary circuit that can be employed to provide the programmed DC current levels of this invention is described in U.S. Pat. No. 3,796,890. The rate of integration of the up-slope circuit is programmed by adjusting the feedback loop of an integration amplifier within the biasing circuit. The desired rate of up-slope (as well as down-slope) is dependent upon the speed of rotation and therefore is tied in to a separate rotational speed sensor. Similarly, the programmed DC current level for a given pass will to some degree be dependent upon the rotational speed of the surface of the workpiece and is similarly tied in to the rotational speed sensor. The rotational speed signal which will programmably vary the DC current as well as many of the other weld parameters is derived from a tachometer mechanically coupled to the turntable drive and calibrated to the specific diameter of the workpiece.

Figure 19:
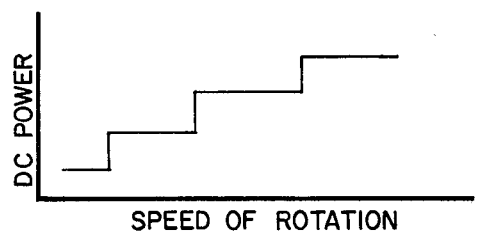
FIG. 19 is a graphical representation of changes in DC weld power vs. changes in rotational speed programmed by this invention.

The actual DC current level for a particular speed along the first pass can be determined experimentally by identifying the amount of power required to establish penetration through the center line 502 of the workpiece; preferably as far as possible into the weld groove on the opposite side without destroying the continuity of the opposite surface. The rate of change of up-slope with increases in rotational speed can also be determined experimentally, but theoretically will follow a substantially linear relationship. However, the relationship between changes in speed of rotation of the surface of the workpiece and the DC weld current level is not necessarily linear and will normally vary in steps as shown in FIG. 19. Thus, the DC current level can be maintained constant for a given pass over a range of rotational speeds.

Figure 17:
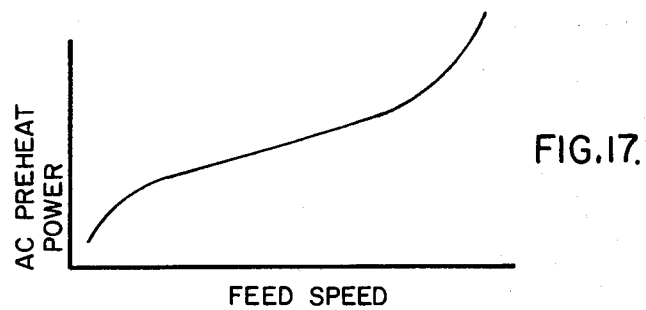
FIG. 17 is a graphical representation of changes in feed speed vs. changes in filler material preheat power programmed by this invention.
Figure 18:
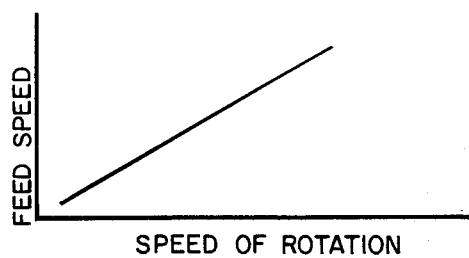
FIG. 18 is a graphical representation of changes in feed speed vs. changes in speed of rotation programmed by this invention.

After a preselected delay following the start of the DC current up-slope, which is timed to enable the workpiece to heat to a sufficient level to melt the filler material upon contact, the wire is inched towards the workpiece from its reference starting point. The moment the feed material contacts the workpiece, as indicated by the AC continuity sensor, the feed speed is up-sloped to its programmed rate of deposit. Similarly, at the moment the feed material contacts the workpiece, the AC preheat current circuit is completed and up-sloped at a rate proportional to the feed speed slope. The relative programmed values for each of the above parameters can vary to some degree with the configuration of the workpiece and the type of metals employed. Therefore, it is desirable initially to determine each parameter and the interrelationships by which they vary experimentally to assure a good weld with the maximum rate of deposit. FIGS. 17, 18 and 19 are representative of how the weld parameters will vary.

The filler material feed speed and the DC weld current can be considered parallel dependent variables in that each is dependent upon the speed of rotation of the surface of the workpiece, however, to a different degree. The rate of change of filler material feed speed with changes in the speed of rotation of the workpiece is substantially linear as shown in FIG. 18. On the other hand, the preheat current level can be considered as directly dependent upon the rate of filler material feed and will vary exponentially with the filler material feed rate over the entire useful range of the filler material feed speed as shown in FIG. 17. To accomplish this end, the filler material preheat power and speed of deposit are constantly monitored and the preheat power is compared to a programmed value (represented by FIG. 17) which is a continuous nonlinear function of the feed speed over its useful range. Any difference is automatically corrected. The programmed value is established by a state of the art analog circuit with the difference employed to bias a solid state controlled AC supply. The other close loop parameters are coordinated in a similar manner.

The initial program values for corresponding rotational speeds and passes are determined experimentally as explained above to obtain the optimum weld puddle illustrated in FIG. 13. Thereafter, increases in rotation of the surface of the workpiece will automatically be compensated for by changes in the other parameters through the closed loop ties in the control circuitry of this invention.

The slope circuits (for up-slope and down-slope) for both the hot wire feed and hot wire heating current are similar to that employed for DC current up-slope as previously explained. The corresponding rate of slope for the programmed workpiece speed and filler material deposition rate is determined experimentally in the same manner as the other weld parameters are established. As soon as the programmed values for the hot wire feed speed and heating current are achieved, the oscillator is turned on to oscillate through a predetermined programmed width to cover the width of the corresponding pass (i.e., pass "a" in FIG. 14) with a predetermined programmed dwell which is gauged to establish good contact with the sides of the weld groove.

Accordingly, at the moment the hot wire touches the weld groove, initiation of the weld is identified by the AC continuity sensor. The output of the AC continuity sensor resets the rotation sensor degree counter to its zero degree setting, which forms a reference for implementation of a number of the programmed events that occur during the next pass in a multipass operation. The rotational sensor identifies the number of degrees of rotation that have been traversed since the onset of welding by separately indicating the number of passes completed and the number of degrees traversed in the pass under completion until the entire welding operation is carried through its programmed cycle. Therefore, while the degree of rotation counter is reset each pass, the pass counter cannot be reset, except manually, until a programmed number of passes are traversed.

After initiation of the first weld pass and up-slope of the programmed parameters to their "weld" (operating) values are achieved for the DC weld current, the hot wire feed speed and the hot wire preheat current, welding will normally proceed at the set parameters until 360° has been traversed corresponding to the point of initial up-taper. At this point in time, two programmed options are available. The output of the rotational sensor as identified by an appropriate decoder is employed to implement taper-down of the hot wire feed, AC preheat current and the DC current to establish a uniform weld depth along the weld groove around its entire circumference. Alternatively, in a multipass operation, such as the one illustrated in FIG. 14, where the oscillator can cover the width of the weld groove through a number of passes, welding can proceed past the first pass without tapering until in this instance four complete passes have been achieved. However, each time the 360° mark is past, the width of weld oscillation is programmed to increase slightly to accommodate the increased width of the weld groove. Each such programmed event is implemented by an appropriate coded output from the rotation sensor which is identified by a corresponding decoder in the circuit employed to implement the event. A similar series of events occurs after the second and third passes until the fourth pass is complete — where the width of oscillation is no longer capable of accommodating the width of the weld groove. At this point in time, as indicated by the cumulative register of the rotation sensor, taper-down is initiated at the same location along the weld groove as initial taper-up was implemented, until a uniform weld depth is established around the circumference of the weld seam. Similarly, changes in the dwell at the extremities of oscillation can be programmed to occur at the same time the width of oscillation is automatically altered to establish an integrated joint with the walls of the weld groove.

After the fourth pass and prior to the start of the fifth pass "e", the weld head is displaced a fixed distance along the oscillator drive before up-taper of the programmed values is implemented as before. Each subsequent pass is implemented in a corresponding manner with the appropriate programmed values being applied. It is emphasized that the weld parameters can be programmed to vary from pass to pass as explained above. Inasmuch as a number of events are programmed to occur between given passes during which a weld is not being deposited, the degree of rotation sensor is arranged to be energized only during the period that the continuity sensors indicate that a weld deposit is being implemented. For example, no degrees of rotation are being registered during the time the weld head is recentered at the beginning of pass "e" to establish the new center line of oscillation. It should be appreciated that where up-taper and down-taper are implemented in a single pass, the pass will require more than 360° to accommodate the overlap required to get a uniform weld depth. Where neither up-taper or down-taper is employed, the pass will require 360°. Therefore, the outputs of the degree of rotation sensor have to be appropriately coded to assure the proper programmed events occur at the appropriate time. The pass counter is separately triggered by the extinguishing of the DC arc in order to avoid false readings that might otherwise occur as a result of the variation in degrees per pass.

In this way, the vertical location of the weld head for each pass and many other weld events are preprogrammed and identified at the right point in time by the cumulative readings of the rotation sensor and the decoder circuits provided on the repositioning motor. The horizontal spacing of the torch with the weld groove is established in the same manner as the first pass by the programmed start sequence which is implemented by appropriate outputs of the degree of rotation sensor which initiates the touch-start relay and the arc voltage control at the appropriate time. For a perfectly round cylindrical barrel programmed control of the system would continue through pass "o" until a complete overlap is achieved. Thus, it can readily be appreciated that quality and reproducibility in weld joints can consistently be obtained.

Figure 16:
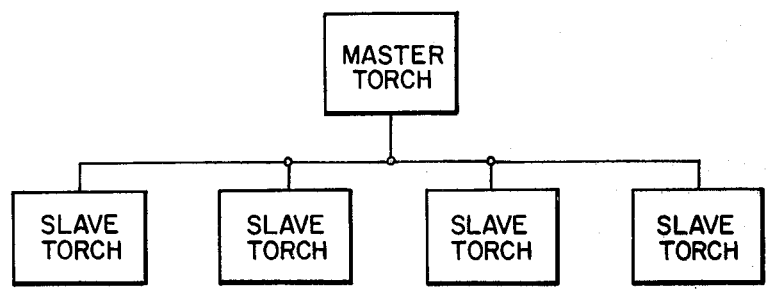
FIG. 16 is a block diagram illustrative of the master-slave relationship between torches in a multi-torch operation in accordance with this invention.

Up to this point only a single torch operation has been considered. The same explanation holds true for a multiple torch operation where the torches are positioned equidistantly around the circumference of the workpiece. In such a case, the events are programmed to occur in the same manner as they occur in a single torch operation, except that the distance required to traverse a pass is defined by the spacing between torches. In addition, it is desirable to establish close loop operation between torches to assure that the ratio of heat input to volume of deposited metal along the weld seam at each weld zone is identical as previously explained. This can be accomplished by establishing a master-slave relation between torches for both the functions of DC weld current and filler material feed speed as figuratively illustrated in FIG. 16. Similarly, the arc voltage control reference voltage can be set from a single source to govern each of the weld heads. Where the weld heads are not spaced equidistantly around the circumference of the weld groove, each of the individual heads will have to be programmed in accordance with the corresponding degree of spacing between its location and the location directly preceding it.

At the operator's discretion, the weld sequence stop is initiated by placing the "weld start/stop" switch 166 (FIG. 9) in the "stop" position and the following events occur automatically:

1. The DC current downslope is started;
2. The hot wire voltage downslope is started;
3. The wire stop delay is initiated;
4. The AC power supply is turned off; and
5. The oscillator is turned off. The operator can then depress the emergency stop button 168 (FIG. 9) to assure that the arc is extinguished; rotation is stopped; the gas is turned off; and the remaining alive systems are deenergized. Of course, it should be appreciated that in the automatic mode of operation of this invention the same events are initiated at the end of the last programmed pass by the rotation sensor in the same manner as startup was accomplished.

When the welding operation is first initiated with dual torch operation, that is, two torches being operated simultaneously, the verification of the locking pin; the gas turn on; the energization of rotation; and the energization of the high frequency are identified at both weld locations. Only when the simultaneous occurrence of all these events is obtained at both locations will the weld start sequence be initiated automatically. The same is true for multi-torch operation with three or more torches.

In addition to the capabilities described a rotating wire brush, aligned with the weld groove and positioned to trail each welding torch is provided for preparing the weld surface for subsequent passes. Further, the apparatus of this invention includes a tracker control circuit, which is responsive to the position of the tracking arm 110 previously described (FIG. 3), which rides along the weld seam in front of the weld torch to correct and align the relative position of the weld head with the weld seam. The tracker control circuit forms part of the DC control circuitry. Its primary components are illustrated in FIG. 11 and include the four power diodes 240 and the relays 242 and 244.

The four diodes a the full wave rectifier that rectifies the 115 AC line voltage 246 to Dc for the motor used to correct alignment of the heads. The motor field voltage 241 is fed directly continuously, while the armature voltage 243 is fed through a 10 ohm, 10 watt surge limiting resistor 248 in a reversing relay circuit 250.

When a direction of travel is selected by the microswitches 116 (FIGS. 5, 6 and 7) activated by vertical displacement of the tracking arm 110, the appropriate relay (("up" 242 "down" 244) is energized applying the proper armature polarity for that direction of travel. When travel is stopped, resistor 248 is placed across the armature as a dynamic brake to reduce coasting. Accordingly, displacement will cause an error signal which will energize the motor in the proper direction to minimize the error, and thus correct the position of the welding head. Each welding head requires its own individual tracking arm which maintains a relative height with respect to the weld groove and does not in any way affect the center line of oscillation as programmed.

The tracking system enables the implementation of complete automatic operation of the system, even with defects in the alignment of the weld seam. Desirably, however as previously explained, a delay is interposed between the indication of a misalignment as identified by the tracking arm and the adjustment implemented to correct alignment. The delay is set equal to the time required to travel the distance between the tracking arm and the weld head so that alignment occurs at the proper point on the weld seam. In this respect, the delay time is tied in to the speed of surface rotation of the workpiece in the same manner as upslope so that changes in rotational speed can automatically be compensated for.

The benefits of the capabilities supplied by this invention become most apparent when applied to a recent innovation in welding commonly referred to as "narrow gap". The narrow gap process employs a weld groove having a slope in the order to 6° as compared with conventional weld grooves that have slopes in the order of 40°. The benefits of this process are apparent in the savings in time and material in establishing the weld, if the structural integrity of the joint is maintained. Little success in maintaining the welds integrity in the narrow gap groove has been achieved to date employing MIG and cold wave TIG welding processes. Even in applying hot wire TIG welding processes in the narrow gap groove it has been difficult to obtain quality and consistency. However, it has been found experimentally that while employing hot wire TIG, tight control of the positioning of the weld torches within the weld groove and close control over each of the weld parameters, quality and reproducibility can be achieved. However, the inaccessibility of the groove because of its narrow dimensions makes such control difficult if not impossible without the capabilities of this invention.

Thus, in accordance with this invention completely automatic operation is achieved in a multipass, multitorch operation that assures that the highest quality welds are achieved in a reproducible manner. In this way, the speed and efficiency of the welding process is increased with an improvement in quality. Once programmed, the welding process can be accelerated without a loss in the quality of the welds achieved.

We claim:

1. A method of welding tubular members of generally circular cross section along a circumferential weld seam characterized in that substantially identical welds are simultaneously produced at a plurality of spaced stationary welding stations positioned around the weld seam in radial symmetry of the tubular member wherein the welding process comprises:
   supporting the tubular members in a vertical orientation;
   rotating the tubular members continuously in one direction about their axes of revolution;
   monitoring the speed of rotation and the number of revolutions of the weld seam and its circumferential position relative to the welding stations and providing corresponding outputs indicative thereof;
   feeding filler material into a weld zone along the seam adjacent each of the welding stations at a given deposition rate which is automatically, programmably varied proportionally with and as a direct function of the monitored output corresponding to the speed of rotation of the tubular member;
   automatically, programmably varying the filler material feed speed, in a preestablished manner, at each welding station, as a direct function of the circumferential position of the weld seam relative to each welding station and the cycle of rotation as identified by the corresponding monitored outputs;
   preheating of the filler material at each of the welding stations to a temperature approaching its melting temperature prior to deposit within the weld zone;
   automatically controlling the power employed to preheat filler material at its operating level at each of the welding stations as a predesignated function of the filler material feed speed;
   simultaneously heating the deposited filler material and the weld zone adjacent each welding station at a rate sufficient to form an integral weldment; and
   automatically controlling the power employed to heat the weld zone adjacent each weld station to vary incrementally at predetermined spaced speed of rotation intervals and remain constant between the predetermined speed levels.

2. The method of claim 1 wherein the weld zone is repetitively moved along the weld seam over a number of passes and wherein the amount of filler material deposited within the weld zone and the power employed to heat the weld zone are automatically, programmably, varied as a function of the position of the weld zone along the seam and the respective pass undergoing completion.

3. The method of claim 2 wherein the filler material feeding the weld zone is oscillated in a direction perpendicular to the direction of movement of the weld zone along the seam to spread the filler material over the width of the weld seam and wherein oscillation is automatically, programmably controlled as a function of the position of the weld zone along the seam and the respective pass undergoing completion and wherein the centerline of oscillation relative to the weld seam is automatically programmably controlled as a function of the respective pass undergoing completion.

4. The method of claim 2 for welding a plurality of weld zones along the weld seam simultaneously and establishing a substantially identical ratio of heat input versus volume of deposited metal along the weld seam at each of the weld zones at any given point in time, wherein the deposition rate of filler material and the heat imparted to each weld zone is maintained as a function of the deposition rate and heat imparted to the other weld zones.

* * * * *